(12) United States Patent
Healey

(10) Patent No.: US 6,858,057 B2
(45) Date of Patent: Feb. 22, 2005

(54) FILTER MEDIA

(75) Inventor: David Thomas Healey, Christiansburg, VA (US)

(73) Assignee: Hollingsworth & Vosa Company, East Walpole, MA (US)

( * ) Notice: Subject to any disclaimer, the term of this patent is extended or adjusted under 35 U.S.C. 154(b) by 0 days.

(21) Appl. No.: 10/386,887

(22) Filed: Mar. 12, 2003

(65) Prior Publication Data

US 2004/0035095 A1 Feb. 26, 2004

Related U.S. Application Data

(62) Division of application No. 09/698,584, filed on Oct. 27, 2000, now Pat. No. 6,554,881.
(60) Provisional application No. 60/162,545, filed on Oct. 29, 1999, and provisional application No. 60/178,348, filed on Jan. 25, 2000.

(51) Int. Cl.$^7$ .................................................. B03C 3/28
(52) U.S. Cl. ........................... 55/528; 55/382; 55/486; 55/527; 55/DIG. 5; 55/DIG. 39; 264/169; 264/210.3; 264/210.4; 264/DIG. 48
(58) Field of Search ................... 55/382, 485–487, 55/527, 528, DIG. 5, DIG. 39; 264/169, 210.3, 210.4, DIG. 48

(56) References Cited

U.S. PATENT DOCUMENTS

| | | |
|---|---|---|
| 3,692,618 A | 9/1972 | Dorschner et al. |
| 3,802,817 A | 4/1974 | Matsuki et al. |
| 3,849,241 A | 11/1974 | Butin et al. |
| 3,855,046 A | 12/1974 | Hansen et al. |
| 3,994,258 A | 11/1976 | Simm |
| 4,230,650 A | 10/1980 | Guignard |
| 4,340,563 A | 7/1982 | Appel et al. |
| 4,536,361 A | 8/1985 | Torobin |
| 4,589,408 A * | 5/1986 | Singer ....................... 128/857 |
| 4,734,227 A | 3/1988 | Smith |
| 4,910,064 A * | 3/1990 | Sabee ......................... 428/113 |
| 4,937,020 A | 6/1990 | Wagner et al. |
| 5,114,631 A | 5/1992 | Nyssen et al. |
| 5,290,626 A | 3/1994 | Nishio et al. |
| 5,389,121 A * | 2/1995 | Pfeffer ........................ 55/487 |
| 5,620,785 A | 4/1997 | Watt et al. |
| 5,643,507 A * | 7/1997 | Berrigan et al. .............. 264/6 |
| 5,645,057 A * | 7/1997 | Watt et al. ............. 128/206.12 |
| 5,645,627 A * | 7/1997 | Lifshutz et al. ................ 96/15 |
| 5,780,153 A | 7/1998 | Chou et al. |
| 5,783,503 A | 7/1998 | Gillespie et al. |
| 5,935,883 A | 8/1999 | Pike |
| 6,428,610 B1 * | 8/2002 | Tsai et al. ...................... 96/15 |
| 6,524,360 B2 * | 2/2003 | Cox et al. ..................... 55/382 |
| 6,547,860 B2 * | 4/2003 | Buchwald et al. ............. 96/17 |
| 6,616,723 B2 * | 9/2003 | Berger ......................... 55/527 |

FOREIGN PATENT DOCUMENTS

DE          19544790          5/1997

OTHER PUBLICATIONS

Merriam–Webster's Ninth New Collegiate Dictionary, 1991, p. 733.*

* cited by examiner

Primary Examiner—Minh-Chau T. Pham
(74) Attorney, Agent, or Firm—Nutter, McClennen & Fish LLP

(57) ABSTRACT

A filter media comprising a synthetic microfiber polymer fine fiber web wherein the diameter of the fibers is between about 0.8 to about 1.5 microns. The filter media is acceptable for use in ASHRAE applications. Constructions with a low DP backing, support or prefilter layers of coarse fiber provide large area filter webs of high efficiency and a stable and high threshold value of alpha above eleven.

18 Claims, 2 Drawing Sheets

FILTER MEDIA

CROSS-REFERENCE TO RELATED APPLICATIONS

This application is a divisional application of U.S. patent application Ser. No. 09/698,584, filed on Oct. 27. 2000, now U.S. Pat. No. 6,554,881, which claims priority to U.S. Provisional Patent Application No. 60/162,545, filed on Oct. 29, 1999 and U.S. Provisional Patent Application No. 60/178,348, filed on Jan. 25, 2000, the contents of which are incorporated herein by reference.

FIELD OF THE INVENTION

This invention relates generally to air filters, and more specifically to a non-woven filter composite and a method for forming the composite.

BACKGROUND OF THE INVENTION

The removal of air borne contaminants from the air is a concern to everyone. Gas phase filtration has traditionally been accomplished by methods which utilize activated carbon. One approach has been to use a carbon/adhesive slurry to glue the carbon to a substrate. However, the adhesive decreases carbon performance by forming a film on its surface. A second approach involves carbonizing an organic based web by heating, followed by carbon activation. This material has a high cost and has relatively low adsorption capacity. A third approach involves forming a slurry of carbon powders and fibers into sheets by a process analogous to a wet papermaking process. This material is medium-to-high cost, and has an undesirable high pressure drop.

Alternatively, carbon particles have been treated with chemicals to increase uptake of air contaminants. However, chemical treatment is not efficient when used in conjunction with an aqueous process, as the aqueous nature of the process either washes away the chemical used to impregnate the carbon, or reacts undesirably with the impregnating chemical rendering it useless. However, filter materials which do not incorporate chemical absorbents into the carbon particles perform far less effectively than those which do include chemically impregnated absorbents.

Another approach to entrain air contamination has been to produce low, medium and high efficiency pleatable composite filter media which include either a low, medium or high efficiency fibrous filtration layer of randomly oriented fibers; and one or more permeable stiffening layers which enable the composite filter media to be pleated and to sustain its shape. Such filtration devices serve as vehicle passenger compartment air filters, high performance engine air filters and engine oil filters. ASHRAE (American Society of Heating Refrigeration and Air Conditioning Engineers) pleatable filters and the like typically use a pleated high efficiency filtration media for the filtration element.

Currently, the pleated high efficiency media normally used in these filtration devices are made from ASHRAE filter media or paper products. These paper products are made by a wet-laid technique wherein fibers, e.g. glass or cellulosic fibers, are dispersed in an aqueous binder slurry which is stirred to cause the fibers to become thoroughly and randomly mixed with each other. The fibers are then deposited from the aqueous binder slurry onto a conventional paper making screen or wire as in a Fourdrinier machine or a Rotoformer machine to form a matted paper which includes a binder resin, e.g., a phenolic resin. Pleated filter elements made from such papers can exhibit high efficiencies. However, these pleated filter elements have low dirt-holding capacities and exhibit high pressure drops.

Electrostatically charged synthetic filter media is also used in these filtering applications, and these can attain very high filtration versus pressure drop performance characteristics, at least in their initial charge state. However, during use many of these products lose their electrostatic charge, or it is masked by deposits, causing filtration efficiency to drop substantially, sometimes to levels below what is acceptable.

Accordingly, there remains a need to provide a relatively low cost, high efficiency filter media for these filtration applications which exhibit relatively high dirt-holding and/or air contaminant capacities and relatively low pressure drops as well as low and medium efficiency filter media which exhibit relatively high dirt-holding capacities and relatively low pressure drops.

SUMMARY OF THE INVENTION

The present invention circumvents the problems described above by providing fiber webs and filter composites which retain particles, air borne contaminants, and/or oil without reduction in filtration performance below a high base threshold even after prolonged filtration challenges. In a particular embodiment, the filter media of the present invention is a polymeric fiber web having a fine fiber layer on a coarser support, and which, after decay of any charge which may be present, possesses an alpha above about 11, i.e. 13 or 14. The web can include an antioxidant within the web matrix. Accordingly, the present invention provides filter media, useful in filtering applications such as air conditioning, ventilation and exhaust ducts as bag filters or pleated panel filters, which relies upon mechanical filtration properties rather than electrostatic charge for its base level of filtration efficiency, thus providing filter media which have enhanced filtration performance characteristics, such as efficiency versus pressure drop characteristics over time.

The present invention comprises a cost effective, high efficiency, low pressure drop, adsorptive, non-woven filter media comprising a high surface area synthetic microfiber, e.g., melt blown, fine fiber layer. The filter media can also include one or more non-woven spun bond layers and can be combined with a coarse fiber support layer. The coarse fiber support layer can itself be a low pressure drop synthetic microfiber, e.g., melt blown, layer adhered to a spun bond layer, and can serve as a prefilter to enhance overall performance. The invention also contemplates a method for forming the filter media comprising dry application of the non-woven fine fiber filter media to the non-woven carrier material. Various layers can be calendared, and the complete multilayer web assembled with heat, with or without a cover sheet.

In one exemplary method of manufacture, a polypropylene resin is extruded by a melt pump through a die having a plurality of extrusion holes to produce large diameter fibers into a stream of hot air which stretches the fibers to a diameter well below several microns and carries them toward a collector belt passing over a vacuum box opposite the extrusion head. Preferably a spun bond mat or web is carried by the collector belt so that the melt-blown fine fibers land on and accumulate on the spun bond layer to produce a large area matrix of filtration material on a support. This material can be used directly on a suitable structural support, or can be further bonded to another layer of course non-woven fibrous support material to form a large area filter media suitable for a variety of commercial uses. Alternatively, the synthetic microfiber fine fibers can be used alone, and the web carried on the collector belt is used only to collect the blown fibers. The synthetic microfiber fine fibers of the invention have an alpha value of at least about 11 or more, i.e., 13 or 14. In a particularly preferred embodiment, the synthetic microfiber fine fibers have an alpha value which remains constant or stable over time. The synthetic microfiber fine fiber web can be calendered to enhance fiber entanglement. In a preferred embodiment, the synthetic microfiber is a melt blown fiber.

In one embodiment, the present invention pertains to filter media which include an effective filtration layer of synthetic microfiber which need not be charged. The actual diameter of the fibers of the synthetic microfiber material is between about 0.8 to about 1.5 microns, i.e. 1.0 microns, as measured by scanning electron microscopy, and in a preferred embodiment, the synthetic microfiber, e.g., melt blown, polymeric material is a polypropylene, e.g., Exxon PP3456G (Exxon, Houston, Tex.) having a melt flow of about 1200, which contains an antioxidant. Preferably the fine fiber has a web basis weight of between about 6 g/m$^2$ and about 25 g/m$^2$, and is generally applied over a coarser support or strengthening layer of low solids such that the web has an alpha value of at least about 11 or more, i.e., 13 or 14. The synthetic microfiber fine fibers of the invention have a 60–65% ASHRAE (at a basis weight of about 6 to about 12 g/m$^2$, e.g., 8 g/m$^2$), 80–85% ASHRAE (at a basis weight of about 15 g/m$^2$ to about 22 g/m$^2$, e.g., 18 g/m$^2$) and 90–95% (at a range of about 18 g/m$^2$ to about 25 g/m$^2$). In a particularly preferred embodiment, the polymer fiber web has an alpha value which remains constant or stable over time.

In another embodiment, the present invention pertains to filter media which include a synthetic microfiber, e.g., melt blown, polymer fine fiber layer which is substantially uncharged, and at least one spun bond fiber or coarse fiber support layer. The diameter of the synthetic microfiber fine fibers is between about 0.8 to about 1.5 microns, i.e. 1.0 microns, and the spun bond or coarse fiber layer acts as a support, prefiltering or strengthening layer. As applied to the upstream side of the filter in a vent or air conditioning flow, the spun bond fiber layer can have a basis weight of between about 5 g/m$^2$ and 10 g/m$^2$, e.g., 8.5 g/m$^2$, and serves as a prefilter. As applied to the downstream side, it can be applied in a layer two to four times more massive, enhancing its function as a support web. The stiffer backing can have a basis weight between about 34 g/m$^2$ and about 55 g/m$^2$, i.e., 40.8 g/m$^2$ and about 54.4 g/m$^2$). Typically the spun bond material is selected from polyesters, polyethylene, polypropylene, or polyamide polymers, and is assembled with the fine fiber layer such that the filter media composite has an alpha value of about 11 or more, i.e., 13 or 14. In a preferred embodiment, the spun bond layer is made of a polypropylene resin manufactured by Reemays. For example, a preferred polypropylene spun bond support with a basis of weight of 40.8 g/m$^2$ is fabricated from TYPAR 3121N (Reemay, Old Hickory, Tenn.) and for a polypropylene spun bond support with a basis weight of about 54.4 g/m$^2$ is fabricated from TYPAR 3151C (Reemay, Old Hickory, Tenn.).

Alternatively, a coarse synthetic microfiber, e.g., melt blown, material which serves as a prefilter can be used as a support and typically has a basis weight between about 50 g/m$^2$ to about 100 g/m$^2$, e.g., 80 g/m$^2$, with a fiber diameter of between about 5 and about 20 microns, e.g., between about 13 and about 17 microns, e.g., between about 13 and 15 microns. For example, the coarse melt blown material can be made from a polypropylene resin having a melt flow of 1200 (polypropylene resin PP3546G, Exxon, Houston, Tex.) or, preferably, a polypropylene having a melt flow of 400 (polypropylene resin HH441, Montell Polymers, Wilmington, Del.). The coarse synthetic microfiber is assembled with the fine fiber layer such that the filter media composite has an alpha value of at least about 11 or more, i.e., 13 or 14.

The combination of the synthetic microfiber, e.g., melt blown, fine fiber with the spun bond fiber layer or coarse synthetic microfiber, e.g., melt blown, layer in a web is unique in that no bonding agents, e.g., adhesives, are required to adhere the two materials to each other. Typically, the two layers are pressed together by a calendering process which causes each layer to physically adhere to the other layer. This provides the advantage that a bonding agent is not incorporated into the composite and does not effect the porosity of the composite filter media.

In still another embodiment, the present invention pertains to filter media which includes a substantially uncharged synthetic microfiber layer that can provide an effective degree of filtration when charge, if any, is dissipated, a spun bond fiber layer and a coarse support fiber layer. Generally, the actual diameter of the synthetic microfiber fine fibers is between about 0.8 to about 1.5 microns and preferably about one micron, and the coarser support fiber layer acts as a support for the finely enmeshed fine fiber web material. Typically the coarse support fiber layer is made of polymers which can also be blown but have lower solids and can, for example have a much higher stiffness and greater fiber diameter. The coarse synthetic microfiber material which serves as a prefilter has a basis weight between about 20 g/m$^2$ to about 100 g/m$^2$, e.g., 80 g/m$^2$, with a fiber diameter of between about 5 and about 20 microns, e.g., between about 13 and about 17 microns, e.g., between about 13 and 15 microns. For example, the coarse synthetic microfiber material can be made from a polypropylene resin having a melt flow of between about 400 and about 1200. For example, a suitable polypropylene resin with a melt flow of 1200 is the polypropylene resin PP3546G, available from Exxon (Houston, Tex.). Preferably, a polypropylene resin having a melt flow of 400 is available from Montell Polymers (Wilmington, Del.), designated as HH441. Preferably, the fine fiber layer is applied to the coarser layers to produce a filter media composite having an alpha value of at least about 11, i.e. 12, 13 or 14. In a preferred embodiment, the synthetic microfiber is a melt blown fiber.

The present invention also pertains to filter media which include a first spun bond fiber layer, a substantially uncharged synthetic microfiber layer, a coarse support fiber layer and a spun bond support fiber layer. It should be understood that additional layers of each material can be included to form the final composite filter media web for particular applications or strength requirements. It should also be understood that the order of layers can be switched so long as the layers are assembled so that an alpha of 11 or more, i.e., 13 or 14, is achieved in the uncharged or charge-decayed state, and typically, the synthetic microfiber fine fiber filter media has fibers of a diameter of between about 0.8 to about 1.5 microns. In general, the filter media of the present invention can be fabricated in a range, e.g., with particle penetrations of 60–65 percent ASHRAE, 80–85 percent ASHRAE, or 90–95 percent ASHRAE, while still achieving the combination of effective filtration for the level of pressure drop. In representative examples below, the amounts of fine fiber can be varied for the different embodiments.

All percentages by weight identified herein are based on the total weight of the web unless otherwise indicated.

BRIEF DESCRIPTION OF THE DRAWINGS

Other objects, advantages and features of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE INVENTION

Figure 1:
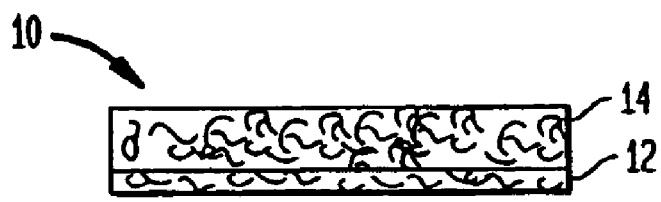
FIG. 1 is a schematic, sectional view of a filter media according to the presenting invention.

The features and other details of the invention will now be more particularly described and pointed out in the claims. It will be understood that the particular embodiments of the invention are shown by way of illustration and not as limitations of the invention. The principle features of this invention can be employed in various embodiments without departing from the scope of the invention.

The present invention circumvents the problems described above by providing fiber webs and filter composites which retain particles, air borne contaminants, and/or oil without significant reduction in filtration performance even after prolonged filtration challenges. In a particular embodiment, the filter media of the present invention is a polymeric fiber web that can include an antioxidant within the web matrix. The fine fiber layer, can for example, be uncharged or can allow decay of charge introduced during manufacture, and is supported on a low solids matrix to provide a filter web to provide a high alpha value. Alpha values are the normalized measure of filter penetration and pressure drop used to rate filters. Accordingly, the present invention provides uncharged filter media useful for use in a variety of air filtration applications, including heating and air conditioning ducts as bag filters or pleated panel filters. The invention also provides filter media which have enhanced filtration performance characteristics.

The present invention comprises a cost effective, high efficiency, low pressure drop, adsorptive, non-woven filter composite comprising a high surface area synthetic microfiber, e.g., melt blown, web and can include one or more non-woven spun bond layers and/or coarse fiber support(s). The invention also contemplates a method for forming the melt blown polymer fiber web and composites thereof comprising dry application of the non-woven filter media to the non-woven carrier or support material, which can be heated and calendared with or without a cover sheet.

In one embodiment, the present invention pertains to filter media which include a substantially uncharged synthetic microfiber web. The diameter of the fibers of the synthetic microfiber material is between about 0.8 to about 1.5 microns, preferably between about 0.9 and 1.5 microns with a most preferred diameter of about one micron, as measured by scanning electron microscopy. In a preferred embodiment, the fibers of the synthetic microfiber material have an average range between about 0.8 and about 1.5 microns. Optical measurements can appear of somewhat larger dimension, but the fine fibers should be under several microns. In a preferred embodiment, the synthetic microfiber polymeric material is polypropylene, although other materials, and even materials such as polyethylene, polybutylene and/or any other polymers which do not inherently possess a charge, such a nylons, can be serviceable. One example of a suitable polypropylene material is available from Exxon Corporation as Exxon PP3456G, a proprietary polypropylene resin composition which contains approximately 0.06 to 0.12 percent of an antioxidant, about 475–690 ppm peroxide, 35–70 ppm of a neutralizer and has a melt flow of about 1200. In a preferred embodiment, the synthetic microfiber is a melt blown polymeric material.

The fine fiber web can have a weight basis of between about 6 g/m$^2$ and about 25 g/m$^2$, e.g., 8 g/m$^2$, 18 g/m$^2$, or 22 g/m$^2$, although in other embodiments this layer can have a web basis of up to about 100 g/m$^2$, and has an alpha value, as measured after elimination of any residual electrostatic charge, of at least about 11, i.e., 12, 13 or 14. In a particularly preferred embodiment, the polymer fiber web has a threshold alpha value which remains substantially constant over time after eliminating any residual electrostatic charge. The fine fiber filter media of the present invention can be fabricated in a range, e.g., with particle penetrations of 60–65 percent ASHRAE, 80–85 percent ASHRAE, or 90–95 percent ASHRAE, while still achieving the combination of effective filtration for the level of pressure drop.

The phrase "synthetic microfibers" is well recognized in the art and is intended to include those fibers which are prepared from polymers having a diameter of about 0.1 micron to about 20 microns, preferably from about 0.1 micron to about 12, and most preferably from about 0.5 microns to about 5 microns, e.g., an average diameter in the range of about 0.8 to about 1.5 microns. In general, the length of the microfibers is from about 0.01 millimeters to continuous, preferably from about 0.1 millimeter to continuous, most preferably from about 5 millimeters to continuous. More generally, the length of the fibers fall within the range of from about 0.1 millimeters to about 25 millimeters, more preferably from about 0.1 millimeters to about 10 millimeters and most preferably from about 1 millimeter to about 7 millimeters. Synthetic microfibers include those known as melt blown fibers, spun bond fibers, meltspun fibers, solutionspun fibers, microfilaments, split fibers and electrospun fibers.

The term "melt blown fibers" is recognized by those having ordinary skill in the art and as used herein indicates fibers formed by extruding a molten thermoplastic polymer through a plurality of fine, usually circular, die capillaries as molten threads or filaments into a high velocity gas stream which attenuate the filaments of molten thermoplastic polymer to reduce their diameter. As is known in the art, the flow rate and pressure of the attenuating gas stream can be adjusted to form continuous melt blown filaments or discontinuous fibers. The formed air-borne fibers, which are not fully quenched, are carried by the high velocity gas stream and deposited on a collecting surface to form a web of randomly dispersed and autogenously bonded melt blown fibers. Exemplary processes for producing melt blown fiber web are disclosed in U.S. Pat. No. 3,849,241 to Butin et al. and U.S. Pat. No. 4,380,570 to Schwarz. In general melt blown fibers have an average fiber diameter of up to about 10 micrometers.

Melt blown materials fall in the general class of textiles referred to as nonwovens as they comprise randomly oriented fibers made by entangling the fibers through mechanical means. The fiber entanglement, with or without some interfiber fusion, imparts integrity and strength to the fabric. The nonwoven fabric can be converted to a variety of end use products as mentioned above, e.g., pool filters.

The term "spunbond fibers" is recognized by those having ordinary skill in the art and as used herein indicates small diameter filaments that are formed by extruding one or more molten thermoplastic polymers as fibers from a plurality of capillaries of a spinneret. The extruded fibers are cooled while being drawn by an eductive or other well-known drawing mechanism to form spunbond fibers. The drawn spunbond fibers are then deposited or laid onto a forming surface in a random manner to form a loosely entangled and uniform fiber web. The laid fiber web is then subjected to a bonding process, such as thermobonding or by needlepunching, to impart physical integrity and dimensional stability. Typically, spunbond fibers have an average diameter of at least about 10 microns. Exemplary processes for producing spunbond nonwoven webs are disclosed, for example, in U.S. Pat. No. 4,340,563 to Appel et al., U.S. Pat. No. 3,802,817 to Matsuki et al., U.S. Pat. No. 3,855,046 to Hansen et al. and U.S. Pat. No. 3,692,618 to Dorschner et al. Spunbonded webs are characterized by a relatively high strength/weight ratio, high porosity, have abrasion resistance properties and are typically non-uniform in such properties as basis weight and coverage.

Spunbonded polymeric nonwoven webs can be produced by extruding polymer through a die to form a multiplicity of continuous thermoplastic polymer strands as the polymer exits holes in the die in a generally downward direction onto a moving surface where the extruded strands are collected in a randomly distributed fashion. The randomly distributed strands are subsequently bonded together by to provide sufficient integrity in a resulting nonwoven web of continuous fibers.

The term "meltspun fibers" is recognized by those having ordinary skill in the art and includes those fibers produced, for example, by U.S. Pat. No. 5,114,631 to Nyssen et al. or U.S. Pat. No. 4,937,020 to Wagner et al. In short, molten polymer is spun radially from a rotating nozzle head producing fibers from 0.1 to 20 microns.

The phrase "solution spun fiber" is recognized by those having ordinary skill in the art and includes, for example, those fibers produced by U.S. Pat. No. 4,734,227 to Smith. These fibers are produced from a solution containing supercritical fluid solvent where polymer is rapidly expanded through a nozzle forming ultrafine fibers of 1 to 5 micron diameter.

The term "microfilaments" is recognized by those having ordinary skill in the art and is intended to include those fibers produced by the process detailed in U.S. Pat. No. 4,536,361 to Torobin. This process provides that a molten polymer is formed into a hollow tube and while the hollow fiber is still molten, it is contacted with an entraining fluid, such as high velocity air, that breaks the tube into microfilaments of 1 to 30 microns before solidifying.

The term "split fibers (also known as island in sea fibers) is recognized by those having ordinary skill in the art and is intended to include those fibers produced by the processes of U.S. Pat. No. 5,783,503 to Gillespie et al; U.S. Pat. No. 5,935,883 to Pike; and U.S. Pat. No. 5,290,626 to Nishioi et al. These patents are directed to the production of two component macrofibers that are produced using a spunbond or melt blown process. The two components are configured in a segmented pie mode alternating the polymers which are subsequently split by hydraulic forces or natural separation with cooling. The two components can also be configured as "islands in the sea" where fine fibrils of one polymer are formed within a matrix polymer. The matrix polymer is dissolved in solvent such as water, forming microfibers smaller than 1.5 micron.

The term "electrospun fibers" is recognized by those having ordinary skill in the art and includes those fibers produced by the processes of U.S. Pat. No. 3,994,258 to Simm and U.S. Pat. No. 4,230,650 to Guignard. The processes provide methods to produce fibers from either a molten polymer or a polymer in a solution that is drawn within an electrostatic field obtaining fine fibers of 2 to 5 microns.

Suitable polymers useful as synthetic microfibers for nonwoven, e.g., carded nonwoven, media of the present invention include polymers described above as well as various polymer resins, including but not limited to, polyolefins such as polyethylene, preferably, polypropylene, polyisobutylene, and ethylene-alpha-olefin copolymers; acrylic polymers and copolymers such as polyacrylate, polymethylmethacrylate, polyethylacrylate, and preferably, esters thereof; vinyl halide polymers and copolymers such as polyvinyl chloride; polyvinyl ethers such as polyvinyl methyl ether; polyvinylidene halides, such as polyvinylidene fluoride and polyvinylidene chloride; polyacrylonitrile; polyvinyl ketones; polyvinyl amines; polyvinyl aromatics such as polystyrene; polyvinyl esters, such as polyvinyl acetate; copolymers of vinyl monomers with each other and olefins, such as ethylene-methyl methacrylate copolymers, acrylonitrile-styrene copolymers, ABS resins, and ethylene-vinyl acetate copolymers; natural and synthetic rubbers, including butadiene-styrene copolymers, polyisoprene, synthetic polyisoprene, polybutadiene, butadiene-acrylonitrile copolymers, polychloroprene rubbers, polyisobutylene rubber, ethylene-propylene rubber, ethylene-propylene-diene rubbers, isobutylene-isoprene copolymers, and polyurethane rubbers; polyesters, such as polyethylene terephthalate; polycarbonates; and polyethers.

The term "substantially uncharged" is intended to mean that the synthetic microfiber, e.g., melt blown, polymer web need not be imparted with an electrostatic charge to any degree that is intended to be present during any significant period of filtration, and that the recited filter characteristics are obtained, even, for example, when the filter has been subjected to a liquid discharging rinse to reduce any charge to its lowest residual level. It is understood, however, that processing or manufacturing of the synthetic microfiber polymer fiber web and/or the support materials used in conjunction with the synthetic microfiber material can impart a charge which can, in that case, initially enhance performance, but upon use as a filter, can be expected to drop substantially and is therefore not considered in the discussion of threshold filter characteristics below. The resulting synthetic microfiber polymer fiber web can be uncharged, that is, such that no measurable charge associated with the synthetic microfiber web or composites thereof. In certain applications, the processed synthetic microfiber polymer fiber web or composites thereof can be treated, before filtration, to remove any charge that results from the manufacturing process. One exemplary charge-reducing treatment involves soaking the fiber web in an alcoholic solution, e.g., about 99% isopropyl alcohol and 1% dioctylphthalate (DOP), to remove any residual charge from the fiber web.

The fact the filter media is "substantially uncharged" is advantageous because the filter media relies on mechanical filtration, not electrostatic properties, to achieve its performance. As a result, filtration performance is substantially consistent, without any reduction in efficiency as a result of electrostatic charge decay. Accordingly, the alpha value of the filter media remains stable or constant at approximately 11, 12, 13 or 14 throughout filtration.

It is believed that the present filter media provides enhanced air filtration properties over current filter media by control over the synthetic microfiber, e.g., melt blown, polymer web fiber diameter. Some of the current ASHRAE filter media products do contain some type of a fibrous layer(s). However, most of these fibrous layers have larger fiber diameters, e.g., 2 microns or greater, and often include binders or other additives within the fibrous structure. Many conventional ASHRAE filter media are also charged, e.g., electrostatically or by formation of electrets. The present invention demonstrates that control of the fiber diameter provides an advantage over currently available materials. In general the fiber diameter of the synthetic microfiber web is maintained below 1.5 microns and is generally in the range of between about 0.8 to about 1.5 microns. In a preferred embodiment, the fiber diameter is maintained such that the average fiber diameter is about 1.0 microns. It is believed that the high surface area of the finely enmeshed synthetic microfibers of the present invention provides an efficient means to remove air borne contaminants without the need for charge additives or electrostatic charge within the filter media.

One way to control the efficiency of the synthetic microfiber web is to control the web basis of the web. The diameter of the fibers of the synthetic microfiber material is between about 0.8 to about 1.5 microns, preferably between about 0.9 and 1.5 microns with a most preferred diameter of about one micron, as measured by scanning electron microscopy. Optical measurements can appear of somewhat larger dimension, but the fine fibers should be under several microns. In a preferred embodiment, the synthetic microfiber polymeric material is polypropylene, although other materials, and even materials such as polyethylene, polybutylene and/or any other polymers which do not inherently possess a charge, such a nylons, can be serviceable. One example of a suitable polypropylene material is available from Exxon Corporation as Exxon PP3456G, a proprietary polypropylene resin composition which contains approximately 0.06 to 0.12 percent of an antioxidant, about 475–690 ppm peroxide, 35–70 ppm of a neutralizer, and has a melt flow of about 1200. The fine fiber web has a weight basis of between about 6 g/m$^2$ and about 25 g/m$^2$, e.g., 8 g/m$^2$, 18 g/m$^2$, or 22 g/m$^2$, and has an alpha value, as measured after elimination of any residual electrostatic charge, of at least about 11, i.e., 13 or 14. In a particularly preferred embodiment, the polymer fiber web has a threshold alpha value which remains substantially constant over time after eliminating any residual electrostatic charge. The fine fiber filter media of the present invention can be fabricated in a range, e.g., with particle penetrations of 60–65 percent ASHRAE, 80–85 percent ASHRAE, or 90–95 percent ASHRAE, while still achieving the combination of effective filtration for the level of pressure drop.

The web basis weight of the polymer fiber web will vary depending upon the requirements of a given filtering application. In general, higher web basis weights yield better filtration, but there exists a higher resistance, or pressure drop, across the filter barrier when the filter media has a higher basis weight. In general the pressure drop across the filter media is typically in the range of approximately 4–5 mm H20 for a high efficiency 90–95% filter at 10.5 fpm airflow velocity, and typically 3–4 mm, and 1–2 mm for filters having 80–85 and 60–65% efficiencies, respectively.

These efficiencies, or particle penetration rates are achieved in the present invention with a low pressure drop backing or support, and the synthetic microfiber fine fiber layer as described herein, where the basis weight of the fine fiber layer is the primary variable for affecting efficiency while achieving a high base level of alpha. One of ordinary skill in the art can readily determine the optimal web basis weight, considering such factors as the desired filter efficiency and permissible levels of resistance. Furthermore, the number of plies of the polymer fiber web used in any given filter application can also vary from approximately 1 to 10 plies. One of ordinary skill in the art can readily determine a number of plies to be used. In a typical application, the filter media web is formed into a bag for insertion into the airflow duct, and several bags can be placed in series for some applications.

Filter performance is evaluated by different criteria. It is desirable that filters, or filter media, be characterized by low penetration across the filter of the contaminants to be filtered. At the same time, however, there should exist a relatively low pressure drop, or resistance, across the filter. Penetration, often expressed as a percentage, is defined as follows:

$$Pen=C/C_0$$

where C is the particle concentration after passage through the filter and $C_0$ is the particle concentration before passage through the filter. Filter efficiency is defined as $$100-\% \text{ Penetration}$$

Because it is desirable for effective filters to maintain values as low as possible for both penetration and pressure drop across the filter, filters are rated according to a value termed alpha ($\alpha$), which is the slope of log penetration versus pressure drop across the filter. Steeper slopes, or higher alpha values, are indicative of better filter performance. Alpha is expressed according to the following formula $$\alpha=-100 \ log \ (C/C_0)/DP,$$

where DP is the pressure drop across the filter. As noted above, this is typically a few mm of $H_2O$.

In many filtering situations it is important to have a high initial alpha value. However, it is equally, if not more important, to maintain acceptable alpha values well into the filtration process. Decaying alpha value is, as noted above, a problem often encountered in certain filtration procedures. In many instances it is thus important to achieve acceptable alpha values well into the filtering process. Some standard tests for evaluating filter performance focus on penetration and resistance (as related by alpha value) after 200 milligrams of loading. Alpha decay is generally not a problem in filtering gases that contain only solids. In fact, in such filtering applications the alpha value often increases over time. The phenomenon of alpha decay is more evident while filtering gases that contain liquid droplets or a mixture of liquid droplets and solid particles.

In another embodiment, the present invention pertains to filter media which includes a substantially uncharged synthetic microfiber, e.g., melt blown, web and a support spun bond fiber layer. The diameter of the synthetic microfibers of the web is between about 0.8 to about 1.5 microns, preferably about 1.0 microns, and the spun bond fiber layer acts as a support and has a basis weight of between about 5 g/m$^2$ and 10 g/m$^2$, preferably, about 8.5 g/m$^2$ when used as a carrier/cover layer (Snow Filtration, Cincinnati, Ohio, distributor for BBA Nonwovens. The 8.5 g/m² spunbond is purchased from the German facility of BBA Nonwovens. Other spun bonds of various grades can be obtained through Snow Filtration at their sites at Washougal, Wash. or Simpsonville, S.C.). A second spun bond layer can also be provided, in which case it can have a greater basis weight to increase its overall strength. The second spun bond layer can have a basis weight between about 34 g/m² and about 55 g/m², i.e., 40.8 g/m² and about 54.4 g/m²). Typically the spun bond material is selected from polyesters, polyethylene, polypropylene, or polyamide polymers, and is assembled with the fine fiber layer such that the filter media composite has an alpha value of about 11 or more, i.e., 13 or 14. In a preferred embodiment, the spun bond layer is made of a polypropylene resin manufactured by Reemay. For example, a preferred polypropylene spun bond support With a basis of weight of 40.8 g/m² is fabricated from TYPAR 3121N (fiber diameter of between about 5 and about 20 microns) (Reemay, Old Hickory, Tenn.) and for a polypropylene spun bond support with a basis weight of about 54.4 g/m² is fabricated from TYPAR 3151C (fiber diameter of between about 5 and about 20 microns)(Reemay, Old Hickory, Tenn.).

The second spun bond layer can itself carry another synthetic microfiber layer, which is preferably a coarse fiber blow melt layer formed in a manner similar to that of the fine fiber layer, but with substantially coarser fibers to form a prefilter/support layer. When this construction is used, the two spun bond webs can be laminated together, with the fine synthetic microfiber layer and the coarse synthetic microfiber layers facing each other to form a single, multilayer web that is integrally joined in a single process line assembly operation to form the finished filter media. Typically the spun bond material selected from materials such as polyesters, polyethylene, polypropylene, or polyamide polymers, is calendared to provide a strong, thin continuous surface on which the synthetic microfiberous filter material is carried. The synthetic microfiber fiber material is deposited onto the spun bond material. Preferably, the filter media composite has an alpha value of at least about 11, i.e., 13 or 14. The average fiber diameter of the spun bond fibers can be between about five microns and about twenty five microns, preferably between about 5 microns and about 20 microns, most preferably between about 5 microns and about 15 microns. In a preferred embodiment, the synthetic microfiber is a melt blown fiber.

In general, a useful basis weight for the spun bond support when used to receive the melt-blown fine fiber filter layer is between about 5 g/m² and about 10 g/m², preferably about 8.5 g/m². However, the basis weight of the support layer can vary depending upon the strength requirements of a given filtering application, and considerably heavier spun bond layers can be used as described above. One of ordinary skill in the art can readily determine the suitable basis weight, considering such factors as the desired level of strength during manufacture or use, intended filter efficiency and permissible levels of resistance or pressure drop. However, in general, the spun bond layer is a relatively thin layer of coarse fibers that primarily serves a structural function, and is to contribute little or nothing to either filtration or pressure drop in the completed web. Spun bond materials are readily available and widely recognized in the art, and this component requires no further discussion.

To prepare suitable filter media useful for ASHRAE applications, the spun bond support is contacted to the synthetic microfibers with pressure blown fibers to adhere to the support and the two materials to become enmeshed with each other. The bond between the two layers is mechanical and no bonding agents are required.

Filter fabrication and the range of variation within the construction parameters for the filter media of the present invention will be better understood following discussion of a representative method of manufacture. Skipping ahead briefly to FIG. 4, there is shown an exemplary method and system 100 for manufacture of filter media having a fine fiber filter layer in accordance with the present invention. As shown, a base resin 101 is mixed in a mixer 102 and is passed to a supply hopper from which an extruder screw feeds the base material through appropriate screens to a melt pump 103 which injects it at high pressure into a die body to be extruded from a plurality of apertures in the die. Additives can be added in the mixer, such as solids or conditioners of various sorts can be added in the mixer, although preferably for forming the fine fiber as described for a basic aspect of the present invention, neither solids nor ACRAWAX are added.

In the exemplary embodiment, a die having 35 apertures per inch of approximately 12.5 mil diameter was used and the material is progressively heated along its path to exit the apertures at elevated temperature into a fast air knife or stream of heated air. The flowing air stretches the fibers to a diameter under several microns, and preferably in the range of 1.0 microns, and carries the hot thin fiber stream across a gap 109 to a collector assembly. The collector assembly includes a traveling collector belt 110 moving over a suction box 111 so that the heated thinned fine fibrous material is forced down onto the belt 110. As noted above, preferably the belt carries a spun bond layer so that the fine fibrous material lands on top of the spun bond layer and contacts it with sufficient pressure to become mechanically joined therewith. Thus, the basic process forms a two layer mat having a fine fibrous synthetic microfiber filter layer over a spun bond support layer. The air carrier stream at the extrusion nozzle is preferably heated to about 570 degrees Fahrenheit for the described polypropylene resin, so the stretched thin fibers landing on the spun bond carrier are tacky and adhere well upon contact. As noted above, the spun bond layer can have a significantly greater fiber diameter and serves to form a web having sufficient continuity to build the fine filter bed, and sufficient mechanical strength for subsequent handling and use.

Figure 4:
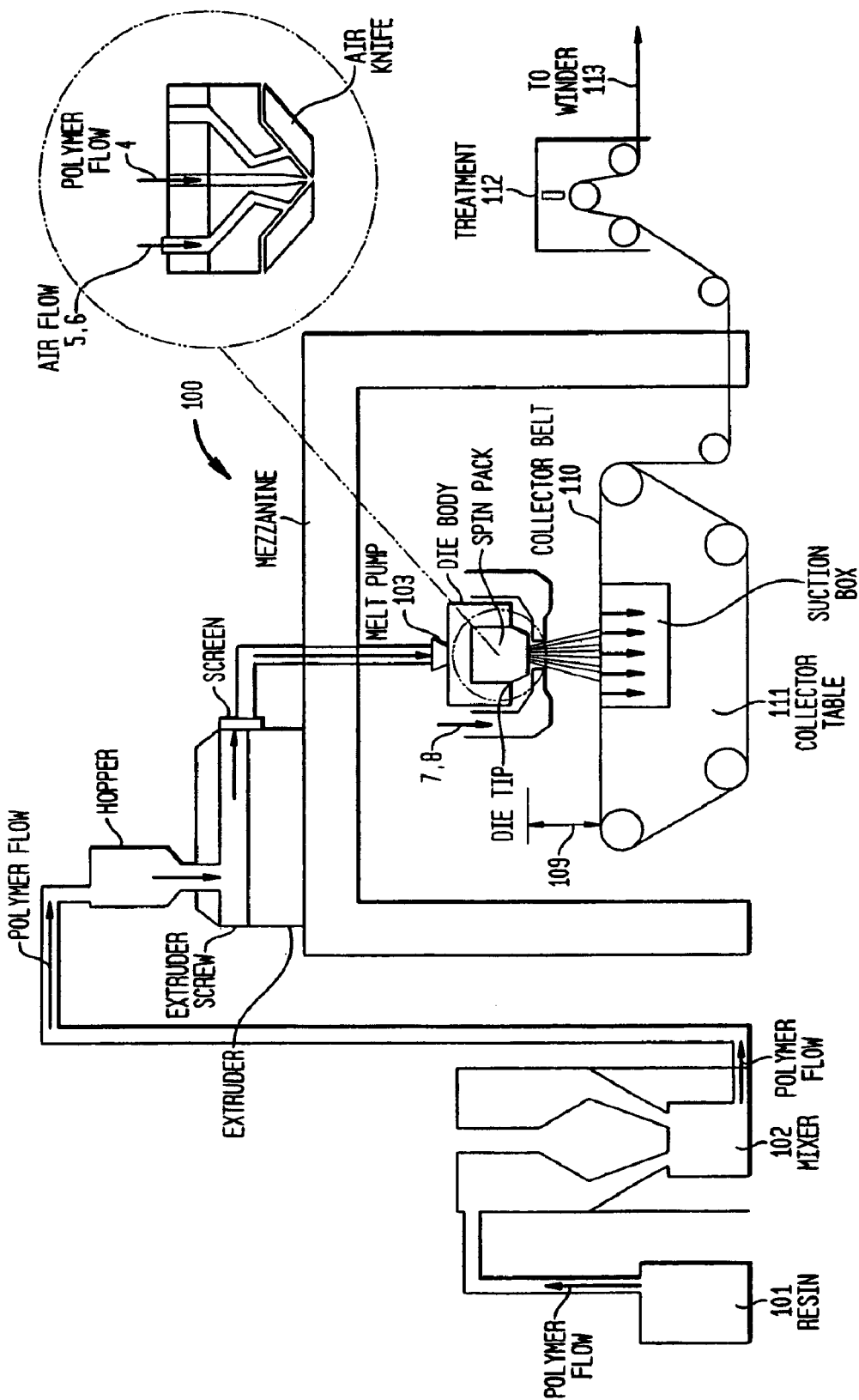
FIG. 4 illustrates a preferred process and system for manufacturing filter media.

As further illustrated in FIG. 4, the web so made is separated from the traveling conveyor belt 110 and can pass to further stations for additional treatments known in the art. These additional treatments can includes steps such as electrostatic treatment in a treatment station such as a plasma chamber or corona gap 112. The web can then pass to a winder 113 for bulk rolling or to other assemblies of known type for cutting, processing or packaging into specific filter units.

Equipment similar to system 100 can be used to form a coarse fiber support layer, by melt blowing a coarse fiber material onto a similar spun bond support web. In the embodiments discussed below, the coarse fiber prefilter or support layer can utilize an extrusion head and heated air knife or airstream directed across the nozzles to produce fibers having a 12–15 micron diameter which can, for example be deposited in a layer as a tangled depth filter layer 40–60 mils thick on the spun bond support. The coarse web so formed can feed in parallel to the web produced by the fine filter fabrication system 100, with the two synthetic microfiber layers contacting each other to join in a four-layer web having the two spun bond layers facing outwardly, and the synthetic microfiber filter layers sandwiched therebetween. These can be joined by physical pressure, with or without application of moderate, non-destructive, heat.

The invention also contemplates that finished filter media webs of various types can be assembled using the basic two layer construction produced by the assembly 100. In addition, filters of different efficiency can be made using the fine fiber layer while still achieving a sustained level of alpha of at least about 11, i.e., 13 or 14, over extended use. The different constructions employ different layers in the basic web, as well as different basis weights of the fiber layers. However, in general, by reducing the basis weight of the fine fiber layer in a given construction, a filter web of lower efficiency is produced while still maintaining a level of alpha of at least about 11, i.e., 13 or 14.

As shown in FIG. 1, filter media composite 10 includes a spun bond layer 12 and a substantially uncharged melt blown polymer fiber web 14 which is mechanically joined to the spun bond layer 12. The melt blown polymer fine fiber web 14 can be deposited with a basis weight of about 6 $g/m^2$ to about 25 $g/m^2$ (grams per square meter) on the support, with the basis weight varied to produce higher or lower efficiency filters. In general, this construction has been found to produce practical and improved filter media for the higher-efficiency applications, having filter efficiency above 60%. The thickness of the spun bond layer 12 is generally about four or five mils, being a thin calendered support of little filtration power. Typically the final thickness of the filter composite as described for the various Figures amounts to a fabric-like web of between about 0.025 and 0.125 inches.

The combination of the synthetic microfiber web with the spun bond fiber layer is unique in that no bonding agents, e.g., adhesives, are required to adhere the two materials to each other. Typically, the two layers are pressed together by a calendering process which causes each layer to physically adhere to the other layer. This provides the advantage that a bonding agent is not incorporated into the composite and does not effect the porosity of the composite filter media.

Figure 3:
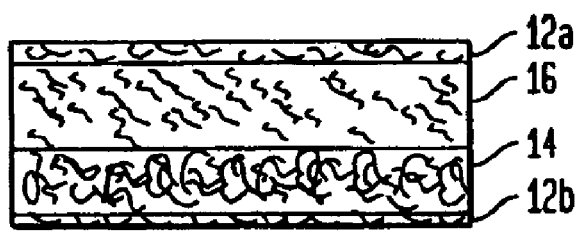
FIG. 3 is a schematic, sectional view of a filter media according to yet another embodiment of the invention.

In still another embodiment, the present invention pertains to filter media which includes a substantially uncharged synthetic microfiber, e.g., melt blown, polymer fiber web, at least one spun bond layer, and a coarse support fiber layer as described in the discussion of FIG. 4 above. In one such embodiment 10$a$, as shown in FIG. 3, a first spun bond layer 12$a$ forms the upstream layer of the filter media. A coarse support fiber layer 16 is immediately adjacent and downstream of the first spun bond layer 12$a$. Downstream and adjacent coarse support fiber layer is the fine synthetic microfiber, e.g., melt blown, polymer layer 14. Finally, a second spun bond layer 12$b$ provides a downstream backing layer. The overall thickness of filter media 10$a$ is about 0.100 inch, but can be varied by applying more or less mass loading in layer 14 for different filter efficiencies. The web basis weight of the first spun bond layer can be between about 34 $g/m^2$ and about 55 $g/m^2$, while for the second spun bond layer the web basis weight can be between about 5 $g/m^2$ and about 10 $g/m^2$, preferably about 8.5 $g/m^2$. As noted above, this spun bond layers can be made from a variety of materials, including polyesters, polyolefins, and polyamides.

The fine synthetic microfiber polymer layer is as described above. That is, this layer is comprised of substantially uncharged fine polypropylene fibers having a diameter in the range of about 0.8 to 1.5 $\mu$m, as measured by SEM, with one embodiment having an average diameter of about 1.0 $\mu$m.

The coarse layer 16 can also be comprised of a polypropylene, with the fiber diameter in the range of about 5 to about 20 microns, e.g., 13–17 $\mu$m, i.e. 13–15 $\mu$m. The base resin can include ACRAWAX and other additives. The web basis weight of the coarse polypropylene layer can be about 20 $g/m^2$ to about 100 $g/m^2$, preferably about 80 $g/m^2$ to provide effective body with some prefiltration and minimal pressure drop. A polypropylene resin with a melt flow index of 400 is preferred, although those resins with melt flow indexes up to and including 1200 can be used to prepare the coarse polypropylene layer. For example, a suitable polypropylene resin with a melt flow of 1200 is the polypropylene resin PP3546G, available from Exxon (Houston, Tex.). Preferably, a polypropylene resin having a melt flow of 400 is available from Montell Polymers (Wilmington, Del.), designated as HH441. The present invention also provides constructions with greater thicknesses of the coarse synthetic microfiber filter layer. In each case, the use of a synthetic microfiber fine fiber layer to achieve a stable and high level of alpha by mechanical filtration is used to produce a filter of greater than 50% efficiency, and preferably the fine fiber layer is specifically controlled to result in a level such as 60–65%, 80–85% or 90–95% ASHRAE filtration of the desired airflow, with an base alpha value of at least about 11, e.g., at least 13, preferably at least 14, over the useful life of the filter.

It is understood that the basis weight of the various layers will vary depending upon the requirements of a given filtering application. One of ordinary skill in the art can readily determine the optimal basis weight, considering such factors as the desired filter efficiency and permissible levels of resistance. Furthermore, the number of plies of the support used in any given filter application can also vary from approximately 1 to 10 plies. The two-layer web of FIG. 1 can be used directly in applications such as respirators and breathing masks having a short lifetime and an extrinsic supporting structure such as a screen, while the four-layer construction of FIG. 3 is preferred for bag filters of large airflows in a commercial or industrial setting. Multiple layers of the basic web are appropriate for some applications to optimize filtration, lifetime, service intervals or other factors of the filtration system. One of ordinary skill in the art can readily determine the optimal number of plies to be used.

The coarse fiber support can include various additives conventionally used in such materials to impart special properties, facilitate extrusion or otherwise improve performance of the material. One suitable additive is a charge stabilizing additive. Examples of charge stabilizing additives include fatty acid amides derived from fatty acids. The term "fatty acid" is recognized by those having ordinary skill in the art and it is intended to include those saturated or unsaturated straight chain carboxylic acids obtained from the hydrolysis of fats. Examples of suitable fatty acids include lauric acid (dodecanoic acid), myristic acid (tetradecanoic acid), palmitic acid (hexadecanoic acid), stearic acid (octadecanoic acid), oleic acid ((Z)-9-octadecenoic acid), linoleic acid ((Z,Z)-9,12-octadecadienoic acid), linolenic acid ((Z,Z,Z)-9,12,15-octadecatrienoic acid) and eleostearic acid (Z,E,E)-9,11,13-octadecatrienoic acid). Typically the amides formed from the above referenced acids are primary amides which are prepared by methods well known in the art. Secondary and tertiary fatty acid amides can also be suitable as charge stabilizing agents wherein the amide nitrogen is substituted with one or more alkyl groups. Secondary and tertiary fatty acid amides can also be prepared by methods well known in the art, such as by esterification of a fatty acid followed by an amidation reaction with a suitable alkylamine. The alkyl substituents on the amide nitrogen can be straight chain or branched chain alkyl groups and can have between about two and twenty carbon atoms, inclusive, preferably between about two and 14 carbon atoms, inclusive, more preferably between about two and six carbon atoms, inclusive, most preferably about two carbon atoms. In a preferred embodiment, the fatty acid amide can be a "bis" amide wherein an alkyl chain tethers two nitrogens of two independent amide molecules. For example, alkylene bis-fatty acid amides include alkylene bis-stearamides, alkylene bis-palmitamides, alkylene bis-myristamides and alkylene bis-lauramides. Typically the alkyl chain tether includes between about 2 and 8 carbon atoms, inclusive, preferably 2 carbon atoms. The alkyl chain tether can be branched or unbranched. Preferred bis fatty acid amides include ethylene bis-stearamides and ethylene bis-palmitamides such as N,N'-ethylenebistearamide and N,N'-ethylenebispalmitamide.

In certain embodiments, the charge stabilizing additive, e.g., a fatty acid amide, can be present within the coarse fiber support at a concentration in the range of about 1.0 to 20% by weight. A preferred concentration for the fatty acid amide charge stabilizing additive is preferably about 1.0%. The ranges of concentrations intermediate to those listed are also intended to be part of this invention, e.g., about 2.5% to about 17%, 4.0% to about 15%, and about 6.0% to about 12.0% by weight. For example, ranges of concentration using a combination of any of the above values recited as upper and/or lower limits are intended to be included, e.g., 1% to about 6%, 2.5 to about 12%, etc.

One type of useful charge stabilizing additive, as noted above, are fatty acid amides. Examples of preferred fatty acid amides include stearamide and ethylene bis-stearamide. An exemplary stearamide is commercially available as UNI-WAX 1750, available from UniChema Chemicals, Inc. of Chicago, Ill. ACRAWAX® C is an ethylene bis-stearamide which is commercially available from Lonza, Inc. of Fair Lawn, N.J. ACRAWAX® C contains N,N'-ethylenebisstearamide (CAS No. 110-30-5) and N,N'-ethylenebispalmitamide (CAS No. 5518-18-3) with a mixture of C-14 to C-18 fatty acid derivatives (CAS No. 67701-02-4) with an approximate ratio of 65/35/2 (N,N'-ethylenebisstearamide/N,N'-ethylenebispalmitamide/mixture of C-14 to C-18 fatty acid derivatives) by weight. For example, the commercial product includes N,N'-ethylenebisstearamide, N,N'-ethylenebispalmitamide with C14–C18 fatty acids. In certain embodiments of the invention, either N,N'-ethylenebisstearamide or N,N'-ethylenebispalmitamide can be the sole charge stabilizing additive. In another embodiment, the ratio of a C14–C18 fatty acid can be varied from between about 0 to 20% based on the total amount of the bisamides. In still other embodiments, mixtures of N,N'-ethylenebisstearamide and N,N'-ethylenebispalmitamide which fall in the range between about 0 to 100% for each bisamide can be utilized as additive mixtures, e.g., 80/20, 70/30, 5/50, etc.

To prepare suitable filter media useful for ASHRAE applications, the coarse fiber support is contacted to the substantially uncharged synthetic microfiber web and pressure is applied to the two layers, thereby causing the fibers of the two materials to become enmeshed with each other. The bond between the two layers is mechanical and no bonding agents are required.

Figure 2:
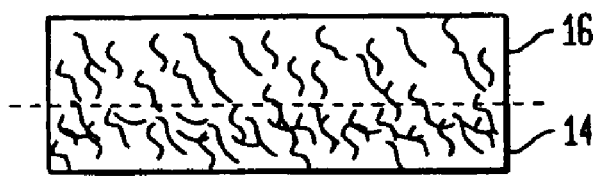
FIG. 2 is a schematic, sectional view of a filter media according to another embodiment of the invention.

As shown in FIG. 2, filter media composite 10 includes a coarse fiber layer 16 and a melt blown polymer fine fiber web 14 which is mechanically entwined with coarse fiber layer 16. The thickness of the coarse fiber layer 16 is generally between about twenty and about one hundred mils, preferably about eighty or ninety mils. Typically the final thickness of the filter composite 10 is between about 0.025 inches and about 0.125 inches as depicted in FIG. 2, although the described construction can also be implemented with thicker support/prefilter layers or thinner total web thickness.

The combination of the synthetic microfiber, e.g., melt blown, web with the coarse synthetic microfiber, e.g., melt blown, layer is unique in that no bonding agents or adhesives, are required to adhere the two materials to each other. Similarly, the melt deposition of either of the synthetic microfiber layers onto the spun bond carrier is a solvent-free process. Typically, the two synthetic microfiber layers on their supports are pressed together between rollers which causes each layer to physically adhere to the other layer. This provides the advantage that a bonding agent is not incorporated into the composite and does not effect the porosity of the composite filter media.

The present invention also pertains to filter media which include a first coarse 16 support fiber layer, a substantially uncharged synthetic microfiber, e.g., melt blown, polymer fiber web 14, a coarse support fiber layer 16 and a spun bond support 12 fiber layer as shown in FIG. 3. It should be understood that additional layers of each material can be included to form the final filter media composite. Selection of how many layers of each layer can be determined by the requirements of the application and by the skilled artisan.

For example, melt blown fibers are collected on a support layer 16 to form the fibrous filtration layer 14 with the finer fibers of the fibrous filtration layer 14 lying predominately adjacent the backing layer 16 and the coarser fibers of the fibrous filtration layer 16 lying predominately adjacent the upstream surface 12 of the fibrous filtration layer 12 thereby providing a fibrous filtration composite 10 which ranges from coarser fibers at the upstream surface 12 to finer fibers 14 at the backing layer 16. An additional support layer 16 can be added to the downstream surface of 14 to provide additional support, and this layer is naturally present when manufactured as described above by blow deposition on a carrier web such as the spun bond web of FIG. 4.

When the upper surface of the fibrous filtration layer 12 functions as the upstream, intake or dirty side of the fibrous filtration layer 12 in the composite filter media 10, the coarser fibers in this less dense portion of the fibrous filtration layer 12 at and adjacent the upstream, intake or dirty side of the filter media serve as a pre-filter, catching and retaining the largest particles from the air, gas or other fluid stream being filtered and thereby preventing these particles from closing the smaller voids between the finer fibers in the more dense portion of the fibrous filtration layer 12 at and adjacent the backing layer 16. Thus, the collection of the coarser fibers at and adjacent the upstream surface 14 of the fibrous filtration layer 14 increases the dirt-holding capacity of the fibrous filtration layer 14 and the composite filter media 10 and the collection of the finer melt blown fibers 14 at and adjacent to the backing layer 16, increases the filtration efficiency of the melt blown filtration layer 14 and the composite filter media 10.

The filter media of the present invention, therefore, provide efficiencies of filtration for air borne contaminants of at least 60–65%, more preferably 80–85% and most preferably between 90–95% with an alpha value of at least 11, i.e., at least 13, preferably 14, based on the removal of total air borne particulates in the unfiltered air. This is a significant improvement over current products which have similar efficiencies but which have lower alpha values of between about 7 and 8.

The substantially uncharged synthetic microfiber, e.g., melt blown, filter web can be prepared by equipment built by J&M Laboratories, Dawsonville, Ga., and the melt blown can be made of Exxon 3546G polypropylene resin. A melt blown fiber web can be made at a throughput of about 3 lb/hr/inch width, with an average fine fiber diameter being about 1 microns. A suitable machine forms 74 inch wide web, and can use a lightweight polypropylene spunbond support. Samples tested for dust removal capacity showed a high alpha, with the finer fiber sizes offering stable and excellent filtration characteristics free of extreme alpha decays experienced with charged filter media.

The following examples serve to further describe the invention.

EXAMPLES

TABLE I

Fine fiber designed to make ASHRAE filters with improved filtration performance after IPA/DOP soak.

| EFFICIENCY LEVEL | 90–95% | 80–85% with TYPAR 3121 N | 80–85% with TYPAR 3151C | 60–65% |
|---|---|---|---|---|
| Air Flow Resistance (mmH$_2$O @ 10.5 FPM) | 5.0 | 3.39 | 3.43 | 1.52 |
| NaCl Penetration (% @ 10.5 FPM) AFTER IPA/DOP SOAK | 25.34 | 33.38 | 30.37 | 70.4 |
| ALPHA AFTER IPA/DOP SOAK | 11.92 | 14.1 | 15.1 | 10.0 |

The 90–95% ASHRAE material was prepared with 34 g/m$^2$ polypropylene spun bond as a first supporting layer and a second spun bond polypropylene supporting layer of 8.5 g/m$^2$. PP3546G (1200 MF resin) was used in a coarse layer at 100 g/m$^2$, with a fine fiber layer blown onto the coarse layer at 24 g/m$^2$. The average fiber diameter of the fine fibers was about 1 micron.

The 80–85% ASHRAE material was prepared with TYPAR 3121N (fiber diameter of 5–20 μm) and TYPAR 3151C (fiber diameter of 5–20 μm) as the backing material. HH441 (400 MF resin) was used in a coarse layer at 80 g/m$^2$, with a fine fiber layer blown onto the coarse layer at 22 g/m$^2$. The average fiber diameter of the fine fibers was about 1 micron.

The 60–65% ASHRAE material was prepared with 34 g/m$^2$ polypropylene spun bond as a first supporting layer and a second spun bond polypropylene supporting layer of 8.5 g/m$^2$. PP3546G (1200 MF resin) was used in a coarse layer at 100 g/m$^2$, with a fine fiber layer blown onto the coarse layer at 8 g/m$^2$.

Table 1 demonstrates that increased alphas are achieved by using a very fine fiber melt blown (approximately 1 micron measured by SEM). It is noted that the 60–65% ASHRAE material has an alpha value of approximately 10. This lower value is due to the minimal amount of fine fiber used in the composite filter and can be increased with additional fine fiber material.

TABLE II

Scrim Type: 0.45 oz/sy white spunbond
Base Resin: Exxon 100%, PP3546G (polypropylene)

PHYSICAL PROPERTIES

| | | Avg | Min | Max | Std Dev | N |
|---|---|---|---|---|---|---|
| Weight | g/m$^2$ | | 14.6 | 19 | 1.52 | 8 |
| CNR Thickness | mils | 128.88 | 128 | 133 | 1.83 | 8 |
| Air Porosity | cfm | 27.50 | 26.5 | 28.5 | 1.00 | 2 |
| NaCl Resistance | @ 32 lpm | 5.29 | 4.51 | 6.14 | 0.64 | 8 |
| NaCl Penetration | % @ 32 lpm | 17.69 | 13.4 | 20.6 | 2.20 | 8 |

CALCULATIONS

| | | |
|---|---|---|
| NaCl Alpha | @ 32 lpm | 14.2150883 |
| Fiber Diameter | | 1.1 microns |
| Fluidity | | 0.0207528 |
| Uncomp. Thickness | | 43.8904683 |

"N" represents the number of tests performed.

The melt blown resin fine fiber (Exxon PP3546G, polypropylene) was produced by extruding the molten material maintained at about 570° F. through a die tip maintained at 575° F. onto Typar 3121 (40 g/m$^2$). The process air attenuating the fiber was also maintained at 575° F. Throughput was approximately 0.27 grams per hole per minute. The die is configured as a hollow 86 inch long triangular bar into which the molten resin is fed. At the apex of the triangle, there are 0.0125 inch drilled holes (diameter) with 35 holes per inch of die face. This configuration results in a throughput of approximately 107 lb/hr of molten resin through the die.

TABLE III

Scrim Type: 0.45 oz/sy white spunbond
Base Resin: Exxon 100%, PP3546G (polypropylene)

PHYSICAL PROPERTIES

| | | Avg | Min | Max | Std Dev | N |
|---|---|---|---|---|---|---|
| Weight | g/m$^2$ | 16.44 | 14.5 | 19 | 1.52 | 8 |
| CNR Thickness | mils | 129.88 | 128 | 133 | 1.83 | 8 |
| Air Porosity | cfm | 27.50 | 26.5 | 28.5 | 1.00 | 2 |
| NaCl Resistance | @ 32 lpm | 5.29 | 4.51 | 6.14 | 0.64 | 8 |
| NaCl Penetration | % @ 32 lpm | 17.69 | 13.4 | 20.6 | 2.20 | 8 |

CALCULATIONS

| | | | |
|---|---|---|---|
| NaCl Alpha | | @ 32 lpm | 14.21508826 |
| With Scrim | Fiber Diameter | μm | 1.369367851 |
| | Solidity | — | 0.015381195 |
| | Fluidity | — | 0.019078658 |
| | Uncomp. Thickness | mm | 46.74869126 |
| Without Scrim | Fiber Diameter | μm | 2.034507332 |
| | Solidity | — | 0.037276356 |
| | Fluidity | — | 0.061005998 |
| | Uncomp. Thickness | mm | 32.27178716 |

The melt blown resin fine fiber (Exxon PP3546G, polypropylene) was produced by extruding the molten material maintained at about 570° F. through a die tip maintained at 575° F. onto Typar 3121 (40 g/f$^2$). The process air attenuating the fiber was also maintained at 575° F. Throughput was approximately 0.27 grams per hole per minute. The die is configured as a hollow 86 inch long triangular bar into which the molten resin is fed. At the apex of the triangle, there are 0.0125 inch drilled holes (diameter) with 35 holes per inch of die face. This configuration results in a throughput of approximately 107 lb/hr of molten resin through the die.

TABLE IV

Scrim: 0.45 oz/sy white spunbond
Resin: Exxon 99%, PP3548G
Additive: Lonza 1%, Acrawax C

PHYSICAL PROPERTIES

| | | Avg | Min | Max | Std Dev | N |
|---|---|---|---|---|---|---|
| Weight | g/m² | 47.05 | 43.06 | 53.39 | 3.55 | 6 |
| C&R Thickness | mils | 24.50 | 21 | 29 | 7.57 | 6 |
| NaCl Resistance | @ 32 lpm | 3.65 | 3.48 | 3.82 | 0.12 | 6 |
| NaCl Penetration | % @ 32 lpm | 33.00 | 29.3 | 36.4 | 2.57 | 6 |

The melt blown resin fine fiber (Exxon PP3546G, polypropylene) was produced by extruding the molten material maintained at about 570° F. through a die tip maintained at 575° F. onto Typar 3121 (40 g/m²). In this example, 1% (by weight) of Acrawax C was blended into the molten polypropylene. The process air attenuating the fiber was also maintained at 575° F. Throughput was approximately 0.27 grams per hole per minute. The die is configured as a hollow 86 inch long triangular bar into which the molten resin is fed. At the apex of the triangle, there are 0.0125 inch drilled holes (diameter) with 35 holes per inch of die face. This configuration results in a throughput of approximately 107 lb/hr of molten resin through the die.

TABLE V

Scrim: 0.45 oz/sy white spunbond
Resin: Exxon 99%, PP3546G
Additive: Lonza 1%, Acrawax C

PHYSICAL PROPERTIES

| | | Avg | Min | Max | Std Dev | N |
|---|---|---|---|---|---|---|
| Weight | g/m² | 47.08 | 43.06 | 53.39 | 3.55 | 6 |
| CNR Thickness | mils | 24.5 | 21 | 29 | 2.57 | 6 |
| Air Porosity | cfm | 33.15 | 31.6 | 34.7 | 1.55 | 2 |
| NaCl Resistance | @ 32 lpm | 3.65 | 3.48 | 3.82 | 0.12 | 6 |
| NaCl Penetration | % @ 32 lpm | 33 | 29.3 | 36.4 | 2.57 | 6 |

CALCULATIONS

| | | | |
|---|---|---|---|
| | NaCl Alpha | @ 32 lpm | 13.191399 |
| With Scrim | Fiber Diameter | μm | 3.1123454 |
| | Solidity | — | 0.0444516 |
| | Fluidity | — | 0.0825011 |
| | Uncomp. Thickness | mm | 46.327828 |
| Without Scrim | Fiber Diameter | μm | 3.5229855 |
| | Solidity | — | 0.0731174 |
| | Fluidity | — | 0.1738757 |
| | Uncomp. Thickness | mm | 28.16495 |

The melt blown resin fine fiber (Exxon PP3546G, polypropylene) was produced by extruding the molten material maintained at about 570° F. through a die tip maintained at 575° F. onto Typar 3121 (40 g/m²). In this example, 1% (by weight) of Acrawax C was blended into the molten polypropylene. The process air attenuating the fiber was also maintained at 575° F. Throughput was approximately 0.27 grams per hole per minute. The die is configured as a hollow 86 inch long triangular bar into which the molten resin is fed. At the apex of the triangle, there are 0.0125 inch drilled holes (diameter) with 35 holes per inch of die face. This configuration results in a throughput of approximately 107 lb/hr of molten resin through the die.

TABLE VI

PHYSICAL PROPERTIES

| | | Avg | Min | Max | Std Dev | N |
|---|---|---|---|---|---|---|
| | g/m² | 147.06 | 133 | 163.6 | 8.21 | 8 |
| Thickness | mils | 194.68 | 191 | 198 | 2.50 | 8 |
| Porosity | cfm | 24.90 | 24.4 | 25.4 | 0.05 | 2 |
| Resistance | @ 32 lpm | 5.29 | 4.81 | 5.83 | 0.40 | 8 |
| Penetration | % @ 32 lpm | 15.50 | 12.7 | 18.6 | 1.81 | 8 |

CALCULATIONS

| | | |
|---|---|---|
| NaCl Alpha | @ 32 lpm | 14.7853766 |
| Fiber Diameter | μm | 4.67236435 |
| Solidity | — | 4.67236435 |
| Fluidity | — | 0.04655431 |
| Uncomp. Thickness | μm | 137.890359 |

A melt blown resin fine fiber (Exxon PP3546G, polypropylene) was produced by extruding the molten material maintained at about 570° F. through a die tip maintained at 575° F. onto Typar 3121 (40 μm²). The process air attenuating the fiber was also maintained at 575° F. Throughput was approximately 0.27 grams per hole per minute. The die is configured as a hollow 86 inch long triangular bar into which the molten resin is fed. At the apex of the triangle, there are 0.0125 inch drilled holes (diameter) with 35 holes per inch of die face. This configuration results in a throughput of approximately 107 lb/hr of molten resin through the die. This fine fiber was extruded onto a coarse melt blown layer described as follows.

The coarse melt blown resin fiber (Exxon PP3546G, polypropylene) was produced by extruding the molten material maintained at about 570° F. through a die tip maintained at 520° F. onto an polypropylene spunbond (8.5 g/m²). The process air attenuating the fiber was also maintained at 520° F. Throughput was approximately 2.26 grams per hole per minute. The die is configured as a hollow 86 inch long triangular bar into which the molten resin is fed. At the apex of the triangle, there are 0.0125 inch drilled holes (diameter) with 35 holes per inch of die face.

The two melt blown composites were then plied together. This is referenced as sample TR2527A.

TABLE VII

PHYSICAL PROPERTIES

| | | Avg | Min | Max | Std Dev | N |
|---|---|---|---|---|---|---|
| Weight | g/m² | 155.75 | 137.7 | 169.2 | 11.51 | 8 |
| CNR Thickness | mils | 153.00 | 105 | 194 | 40.61 | 8 |
| Air | cfm | 26.45 | 24.4 | 28.5 | 2.05 | 2 |

TABLE VII-continued

| Porosity | | | | | | |
|---|---|---|---|---|---|---|
| NaCl Resistance | @ 32 lpm | 3.26 | 4.57 | 3.98 | 0.38 | 8 |
| NaCl Penetration | % @ 32 lpm | 15.75 | 13.7 | 19.2 | 1.84 | 8 |

| CALCULATIONS | | | |
|---|---|---|---|
| NaCl Alpha | | @ 32 lpm | 14.99009229 |
| Fiber Diameter | μm | | 4.679593913 |
| Solidity | — | | 0.034251033 |
| Fluidity | — | | 0.054456238 |
| Uncomp. Thickness | mm | | 198.8879333 |

A melt blown resin fine fiber (Exxon PP3546G, polypropylene) was produced by extruding the molten material maintained at about 570° F. through a die tip maintained at 575° F. onto Typar 3121 (40 g/m²). The process air attenuating the fiber was also maintained at 575° F. Throughput was approximately 0.27 grams per hole per minute. The die is configured as a hollow 86 inch long triangular bar into which the molten resin is fed. At the apex of the triangle, there are 0.0125 inch drilled holes (diameter) with 35 holes per inch of die face. This configuration results in a throughput of approximately 107 lb/hr of molten resin through the die. This fine fiber was extruded onto a coarse melt blown layer described as follows.

The coarse melt blown resin fiber (Exxon PP3546G, polypropylene) was produced by extruding the molten material maintained at about 570° F. through a die tip maintained at 520° F. onto a polypropylene spunbond (8.5 g/m²). In this example, 1% (by weight) of Acrawax C was blended into the molten polypropylene. The process air attenuating the fiber was also maintained at 520° F. Throughput was approximately 2.26 grams per hole per minute. The die is configured as a hollow 86 inch long triangular bar into which the molten resin is fed. At the apex of the triangle, there are 0.0125 inch drilled holes (diameter) with 35 holes per inch of die face.

The two melt blown composites were then plied together. This is referenced as sample TR2527B.

TABLE VIII

| PHYSICAL PROPERTIES | | | | | | |
|---|---|---|---|---|---|---|
| | | Avg | Min | Max | Std Dev | N |
| Weight | g/m² | 147.186 | | 172.8 | 15.84 | 8 |
| CNR Thickness | mils | 84.50 | | 100 | 10.27 | 8 |
| Air Porosity | cfm | 30.285 | | 31.5 | 1.55 | 2 |
| NaCl Resistance | @ 32 lpm | 4.9889 | | 5.44 | 0.46 | 8 |
| NaCl Penetration | % @ 32 lpm | 24.565 | | 20.0 | 3.03 | 8 |

| CALCULATIONS | | | |
|---|---|---|---|
| NaCl Alpha | | @ 32 lpm | 13.2094058 |
| Fiber Diameter | μm | | 5.069208513 |
| Solidity | — | | 0.04370031 |
| Fluidity | — | | 0.075082098 |

A melt blown resin fine fiber (Exxon PP3546G, polypropylene) was produced by extruding the molten material maintained at about 570° F. through a die tip maintained at 575° F. onto Typar 3121 (40 g/m²). In this example, 1% (by weight) of Acrawax C was blended into the molten polypropylene. The process air attenuating the fiber was also maintained at 575° F. Throughput was approximately 0.27 grams per hole per minute. The die is configured as a hollow 86 inch long triangular bar into which the molten resin is fed. At the apex of the triangle, there are 0.0125 inch drilled holes (diameter) with 35 holes per inch of die face. This configuration results in a throughput of approximately 107 lb/hr of molten resin through the die. This fine fiber was extruded onto a coarse melt blown layer described as follows.

The coarse melt blown resin fiber (Exxon PP3546G, polypropylene) was produced by extruding the molten material maintained at about 570° F. through a die tip maintained at 520° F. onto a polypropylene spunbond (8.5 g/m²). The process air attenuating the fiber was also maintained at 520° F. Throughput was approximately 2.26 grams per hole per minute. The die is configured as a hollow 86 inch long triangular bar into which the molten resin is fed. At the apex of the triangle, there are 0.0125 inch drilled holes (diameter) with 35 holes per inch of die face.

The two melt blown composites were then plied together. This is referenced as sample TR2527C.

TABLE IX

| PHYSICAL PROPERTIES | | | | | | |
|---|---|---|---|---|---|---|
| | | Avg | Min | Max | Std Dev | N |
| Weight | g/m² | 159.49 | 136.5 | 172.7 | 12.95 | 8 |
| CNR Thickness | mils | 150.25 | 108 | 198 | 35.15 | 8 |
| Air Porosity | cfm | 28.00 | 27.5 | 26.5 | 0.05 | 2 |
| NaCl Resistance | @ 32 lpm | 4.90 | 4.12 | 5.75 | 0.50 | 8 |
| NaCl Penetration | % @ 32 lpm | 24.55 | 19.1 | 28 | 3.14 | 8 |

| CALCULATIONS | | | |
|---|---|---|---|
| NaCl Alpha | | @ 32 lpm | 12.4384095 |
| Fiber Diameter | μm | | |
| Solidity | — | | |
| Fluidity | — | | |

A melt blown resin fine fiber (Exxon PP3546G, polypropylene) was produced by extruding the molten material maintained at about 570° F. through a die tip maintained at 575° F. onto Typar 3121 (40 g/m²). In this example, 1% (by weight) of Acrawax C was blended into the molten polypropylene. The process air attenuating the fiber was also maintained at 575° F. Throughput was approximately 0.27 grams per hole per minute. The die is configured as a hollow 86 inch long triangular bar into which the molten resin is fed. At the apex of the triangle, there are 0.0125 inch drilled holes (diameter) with 35 holes per inch of die face. This configuration results in a throughput of approximately 107 lb/hr of molten resin through the die. This fine fiber was extruded onto a coarse melt blown layer described as follows.

The coarse melt blown resin fiber (Exxon PP3546G, polypropylene) was produced by extruding the molten material maintained at about 570° F. through a die tip maintained at 520° F. onto a polypropylene spunbond (8.5 g/m²). In this example, 1% (by weight) of Acrawax C was blended into the molten polypropylene. The process air attenuating the fiber was also maintained at 520° F. Throughput was approximately 2.26 grams per hole per minute. The die is configured as a hollow 86 inch long triangular bar into which the molten resin is fed. At the apex of the triangle, there are 0.0125 inch drilled holes (diameter) with 35 holes per inch of die face.

The two melt blown composites were then plied together. This is referenced as sample TR2527D.

TABLE X

PHYSICAL PROPERTIES

|  |  | Avg | Min | Max | Std Dev | N |
|---|---|---|---|---|---|---|
| Weight | g/m² | 110.61 | 102.9 | 124.4 | 6.66 | 9 |
| CNR Thickness | mils | 88.33 | 75 | 100 | 7.21 | 9 |
| Air Porosity | cfm | 59.80 | 57.7 | 61.9 | 2.10 | 3 |
| NaCl Resistance | @ 32 lpm | 0.71 | 0.58 | 0.89 | 0.10 | 9 |
| NaCl Penetration | % @ 32 lpm | 82.37 | 73 | 86.4 | 3.64 | 9 |

CALCULATIONS

| NaCl Alpha | @ 32 lpm | 11.6659872 |
|---|---|---|
| Fiber Diameter | μm | 5.92011845 |
| Solidity | — | 0.03389048 |
| Fluidity | — | 0.05369381 |
| Uncomp. Thickness | mm | 142.772678 |

In this example, only the coarse melt blown resin fiber (Exxon PP3546G, polypropylene) was produced by extruding the molten material maintained at about 570° F. through a die tip maintained at 520° F. onto a polypropylene spunbond (8.5 g/²). The process air attenuating the fiber was also maintained at 520° F. Throughput was approximately 2.26 grams per hole per minute. The die is configured as a hollow 86 inch long triangular bar into which the molten resin is fed. At the apex of the triangle, there are 0.0125 inch drilled holes (diameter) with 35 holes per inch of die face.

TABLE XI

PHYSICAL PROPERTIES

|  |  | Avg | Min | Max | Std Dev | N |
|---|---|---|---|---|---|---|
| Weight | g/m² | 112.94 | 99 | 136.5 | 9.33 | 16 |
| CNR Thickness | mils | 121.00 | 89 | 156 | 19.43 | 16 |
| Air Porosity | cfm | 273.20 | 269.8 | 276.6 | 3.40 | 2 |
| NaCl Resistance | @ 32 lpm | 0.50 | 0.3 | 0.71 | 0.11 | 16 |
| NaCl Penetration | % @ 32 lpm | 34.86 | 78.1 | 89 | 3.28 | 16 |

CALCULATIONS

| NaCl Alpha | @ 32 lpm | 14.3529388 |
|---|---|---|
| Fiber Diameter | μm | 12.9848733 |
| Solidity | — | 0.03710027 |
| Fluidity | — | 0.06051716 |
| Uncomp. Thickness | mm | 133.170755 |

In this example, only the coarse melt blown resin fiber (Exxon PP3546G, polypropylene) was produced by extruding the molten material maintained at about 570° F. through a die tip maintained at 520° F. onto a polypropylene spunbond (8.5 g/m²). In this example, 1% (by weight) of Acrawax C was blended into the molten polypropylene. The process air attenuating the fiber was also maintained at 520° F. Throughput was approximately 2.26 grams per hole per minute. The die is configured as a hollow 86 inch long triangular bar into which the molten resin is fed. At the apex of the triangle, there are 0.0125 inch drilled holes (diameter) with 35 holes per inch of die face.

TABLE XII

Isopropyl Alcohol/IPA electrostatic discharge testing

| Grade | TR2527A | | TR2527B | | TR2527C | | TR2527D | |
|---|---|---|---|---|---|---|---|---|
| Roll # | 0101 | 0102 | 0101 | 0102 | 0101 | 0102 | 0101 | 0102 |
| NaCl Resistance (mmH20 @ 32 LPM) Before IPA | 5.98 | 5.61 | 5.41 | 5.96 | 4.55 | 4.52 | 4.49 | 4.73 |
| NaCl Penetration (% @ 32 LPM) Before IPA | 14.7 | 16.9 | 13.6 | 14 | 26 | 20.7 | 29.3 | 23.5 |
| NaCl Penetration (% @ 32 LPM) After IPA | 20.7 | 23.1 | 22.4 | 20.2 | 38 | 39.3 | 38.9 | 32.6 |
| DOP Penetration (% @ 64 LPM) After IPA | 48.2 | 49.3 | 49.4 | 46.8 | 65.8 | 59.7 | 63.6 | 63.6 |
| Alpha | 11.5 | 11.3 | 12.6 | 14.7 | 9.0 | 9.0 | 9.1 | 10.3 |

TABLE XIII

Scrim Type: 0.45 oz/sy white spunbond
Base Resin: Exxon PP3546G, 100% (polypropylene)

PHYSICAL PROPERTIES

|  |  | Avg | Min | Max | Std Dev | N |
|---|---|---|---|---|---|---|
| Weight | g/m² | 37.20 | 34.9 | 38.3 | 1.97 | 8 |
| CNR Thickness | mils | 25.50 | 23 | 29 | 2.15 | 8 |
| Air Porosity | cfm | 36.05 | 32.6 | 39.5 | 3.45 | 2 |
| NaCl Resistance | @ 32 lpm | 4.42 | 3.77 | 5.13 | 0.48 | 8 |
| NaCl Penetration | % @ 32 lpm | 23.26 | 19.3 | 26.7 | 2.69 | 8 |

CALCULATIONS

| NaCl Alpha | @ 32 lpm | 14.33309451 |
|---|---|---|
| Fiber Diameter | μm | 2.723976872 |
| Solidity | — | 0.038422218 |
| Fluidity | — | 0.063539903 |
| Uncomp. Thickness | mm | 42.35728004 |

The melt blown resin fine fiber (Exxon PP3546G, polypropylene) was produced by extruding the molten material maintained at about 570° F. through a die tip maintained at 575° F. onto Typar 3121 (40 g/m²). The process air attenuating the fiber was also maintained at 575° F. Throughput was approximately 0.27 grams per hole per minute. The die is configured as a hollow 86 inch long triangular bar into which the molten resin is fed. At the apex of the triangle, there are 0.0125 inch drilled holes (diameter) with 35 holes per inch of die face. This configuration results in a throughput of approximately 107 lb/hr of molten resin through the die.

TABLE XIV

Scrim Type: 0.25 oz/sy pp Amoco spunbond
Base Resin: Exxon 99%, PP3548G and Lonza Acrawax C, 1%

PHYSICAL PROPERTIES

|  |  | Avg | Min | Max | Std Dev | N |
|---|---|---|---|---|---|---|
| Weight | g/m² | 121.93 | 105.5 | 142.9 | 9.42 | 20 |
| CNR Thickness | mils | 92.66 | 75 | 109 | 9.72 | 20 |
| Air Porosity | cfm | 300.20 | 243.4 | 357 | 56.80 | 2 |
| NaCl Resistance | @ 32 lpm | 0.47 | 0.36 | 0.57 | 0.05 | 20 |
| NaCl Penetration | % @ 32 lpm | 54.24 | 50.2 | 62.2 | 2.70 | 20 |

CALCULATIONS

| NaCl Alpha | @ 32 lpm | 56.548255541 |
|---|---|---|
| Fiber Diameter | μm | 14.26002388 |
| Solidity | — | 0.038873143 |
| Fluidity | — | 0.06457523 |
| Uncomp. Thickness | mm | 132.2040265 |

In this example, only the coarse melt blown resin fiber (Exxon PP3546G, polypropylene) was produced by extruding the molten material maintained at about 570° F. through a die tip maintained at 520° F. onto a polypropylene spunbond (8.5 g/m²). In this example, 1% (by weight) of Acrawax C was blended into the molten polypropylene. The process air attenuating the fiber was also maintained at 520° F. Throughput was approximately 2.26 grams per hole per minute. The die is configured as a hollow 86 inch long triangular bar into which the molten resin is fed. At the apex of the triangle, there are 0.0125 inch drilled holes (diameter) with 35 holes per inch of die face.

TABLE XV

Scrim Type: 0.45 oz/sy white spunbond (15.3 g/m² scrim; meltblown weight approx. 18.5 g/m²)
Base Resin: Exxon 100%, PP3548G

PHYSICAL PROPERTIES

|  |  | Avg | Min | Max | Std Dev | N |
|---|---|---|---|---|---|---|
| Weight | g/m² | 33.8625 | 31.8 | 37.9 | 2.0432434 | 8 |
| CNR Thickness | mils | 20.125 | 18 | 23 | 1.615356 | 8 |
| Air Porosity | cfm | 45.05 | 44.7 | 45.4 | 0.35 | 2 |
| NaCl Resistance | @ 32 lpm | 3.415 | 3.06 | 3.89 | 0.2477902 | 8 |
| NaCl Penetration | % @ 32 lpm | 10.30375 | 6.55 | 12.5 | 1.2377695 | 8 |

CALCULATIONS

| NaCl Alpha | @ 32 lpm | 28.002041 |
|---|---|---|
| Fiber Diameter | μm | 3.1700555 |
| Solidity | — | 0.0511643 |
| Fluidity | — | 0.1007797 |
| Uncomp. Thickness | mm | 28.951806 |

The melt blown resin fine fiber (Exxon PP3546G, polypropylene) was produced by extruding the molten material maintained at about 570° F. through a die tip maintained at 575° F. onto Typar 3121 (40 g/m²). The process air attenuating the fiber was also maintained at 575° F. Throughput was approximately 0.27 grams per hole per minute. The die is configured as a hollow 86 inch long triangular bar into which the molten resin is fed. At the apex of the triangle, there are 0.0125 inch drilled holes (diameter) with 35 holes per inch of die face. This configuration results in a throughput of approximately 107 lb/hr of molten resin through the die.

TABLE XVI

Scrim Type: 0.25 oz/sy pp Amoco spunbond
Base Resin: Exxon 99%, PP3548G and Lonza AcrawaxC, 1%

PHYSICAL PROPERTIES

|  |  | Avg | Min | Max | Std Dev | N |
|---|---|---|---|---|---|---|
| Weight | g/m² | 121.93 | 195.5 | 142.9 | 4.42 | 20 |
| CNR Thickness | mils | 92.55 | 76 | 103 | 9.72 | 20 |
| Air Porosity | cfm | 300.20 | 242.4 | 3.57 | 54.40 | 3 |
| NaCl Resistance | @ 32 lpm | 0.47 | 0.36 | 0.57 | 0.03 | 20 |
| NaCl Penetration | % @ 32 lpm | 54.24 | 50.2 | 63.3 | 3.70 | 20 |

CALCULATIONS

| NaCl Alpha | @ 32 lpm | 58.64625568 |
|---|---|---|
| Fiber Diameter | μm | 14.260023988 |
| Solidity | — | 0.038873445 |
| Fluidity | — | 0.04457427 |
| Uncomp. Thickness | mm | 137.2040365 |

In this example, only the coarse melt blown resin fiber (Exxon PP3546G, polypropylene) was produced by extruding the molten material maintained at about 570° F. through a die tip maintained at 520° F. onto a polypropylene spunbond (8.5 g/m²). In this example, 1% (by weight) of Acrawax C was blended into the molten polypropylene. The process air attenuating the fiber was also maintained at 520° F. Throughput was approximately 0.27 grams per hole per minute. The die is configured as a hollow 86 inch long triangular bar into which the molten resin is fed. At the apex of the triangle, there are 0.0125 inch drilled holes (diameter) with 35 holes per inch of die face.

TABLE XVII

PHYSICAL PROPERTIES

|  |  | Avg | Min | Max | Std Dev |
|---|---|---|---|---|---|
| Weight | g/m² | 145.1125 | 131.3 | 155.9 | 7.22 |
| CNR Thickness | mils | 76.375 | 64 | 103 | 13.16 |
| Air Porosity | @ 65.5 lpm | 3.01625 | 2.46 | 3.69 | 0.30 |
| NaCl Resistance | % @ 65.5 lpm | 30.2375 | 24.1 | 34.3 | 3.28 |
| NaCl Penetration | % @ 65.5 lpm | 70.3875 | 62.9 | 77.8 | 5.62 |

CALCULATIONS

| NaCl Alpha | @ 65.5 lpm | 17.2 |
|---|---|---|
| NaCl Alpha after IPA/DOP | @ 65.5 lpm | 4.65 |

Testing of TR2527 A material.

TABLE XVIII

Scrim Type: 0.25 oz/sy pp Amoco spunbond
Base Resin: Exxon 99%, PP3546G; Lonza Acrawax C, 1%

PHYSICAL PROPERTIES

|  |  | Avg | Min | Max | Std Dev | N |
|---|---|---|---|---|---|---|
| Weight | g/m² | 121.93 | 105.5 | 142.9 | 8.42 | 20 |
| CNR | mils | 92.55 | 76 | 109 | 9.72 | 20 |

TABLE XVIII-continued

| | | | | | | |
|---|---|---|---|---|---|---|
| Thickness | | | | | | |
| Air Porosity | cfm | 300.20 | 243.4 | 357 | 58.80 | 2 |
| NaCl Resistance | @ 32 lpm | 0.47 | 0.36 | 0.57 | 0.05 | 20 |
| NaCl Penetration | % @ 32 lpm | 54.24 | 50.2 | 62.2 | 2.79 | 20 |

CALCULATIONS

| | | |
|---|---|---|
| NaCl Alpha | @ 32 lpm | 56.64825568 |
| Fiber Diameter | μm | 14.26002388 |
| Solidity | — | 0.038873145 |
| Fluidity | — | 0.05457623 |
| Uncomp. Thickness | mm | 137.2040265 |

Testing of TR2526B material.

TABLE XIX

Scrim Type: 0.45 oz/sy white spunbond (scrim weight 15.3 $g/m^2$; meltblown approximately 8.5 $g/m^2$) (fine layer only of Table XVII)
Base Resin: Exxon 100%, PP3546G

PHYSICAL PROPERTIES

| | | Avg | Min | Max | Std Dev | N |
|---|---|---|---|---|---|---|
| Weight | $g/m^2$ | 24.11375 | 23.3 | 25.41 | 0.06 | 8 |
| CNR Thickness | mils | 13.5 | 11 | 15 | 1.41 | 8 |
| Air Porosity | cfm | 173.6 | 150.5 | 186.7 | 13.10 | 2 |
| NaCl Resistance | @ 32 lpm | 1.00125 | 0.73 | 1.26 | 0.15 | 8 |
| NaCl Penetration | % @ 32 lpm | 38.4375 | 32.7 | 43.9 | 3.12 | 8 |

TABLE XX (90–95% ASHRAE)
RUN 1

| | |
|---|---|
| Scrim Being blown Onto: | Typar 3121 |
| Layer being collated in: | TR2786A (Coarse fibered meltblown Prefilter) |
| Resin Being Used: | PP3546G (Exxon Resin) |
| Additives Being used: | NONE |
| Trial Name: | TR2841A |
| LOT: | 0510129 |

| TEST | UNITS | Average | Minimum | Maximum | St. Dev. | N |
|---|---|---|---|---|---|---|
| Basis Weight (entire product) | $(g/m^2)$ | 150.28 | 127.4 | 176.5 | 10.33 | 48 |
| Basis Weight (fine fiber only) | $(g/m^2)$ | 23.2 | 23.2 | 23.2 | 0 | 1 |
| NaCl Resistance | (mmH$_2$O @ 32 LPM) | 4.9 | 4.32 | 5.57 | 0.34 | 48 |
| NaCl Penetration (after IPA/DOP soak) | (% @ 32 LPM) | 24.45 | 20.6 | 29.3 | 2.59 | 12 |
| NaCl Alpha after IPA/DOP soak | (Unitless) | 12.484105 | | | | |
| Fiber Diameter (fine fiber only) | (Microns) | 1.02 | | | | |

TABLE XXI

RUN 2

| | |
|---|---|
| Scrim Being blown Onto: | Typar 3121 |
| Layer being collated in: | TR2786A (Coarse fibered meltblown Prefilter) |
| Resin Being Used: | PP3546G (Exxon Resin) |
| Additives Being used: | NONE |
| Trial Name: | TR2841A |
| LOT: | 0510295 |

| TEST | UNITS | Average | Minimum | Maximum | St. Dev | N |
|---|---|---|---|---|---|---|
| Basis Weight (entire product) | $(g/m^2)$ | 160.7 | 145.5 | 186.4 | 8.76 | 30 |
| Basis Weight (fine fiber only) | $(g/m^2)$ | 25.84 | 24.54 | 26.7 | 0.81 | 4 |
| NaCl Resistance | (mmH$_2$O @ 32 LPM) | 4.87 | 3.93 | 6 | 0.44 | 30 |
| NaCl Penetration (after IPA/DOP soak) | (% @ 32 LPM) | 28.85 | 27.3 | 30.4 | 1.55 | 2 |
| NaCl Alpha after IPA/DOP soak | (Unitless) | 11.085301 | | | | |
| Fiber Diameter (fine fiber only) | (Microns) | 1.14 | | | | |

TABLE XXII

80–85% ASHRAE
RUN 1

| | |
|---|---|
| Scrim Being blown Onto: | Typar 3121 |
| Layer being collated in: | TR2786A (Coarse fibered meltblown Prefilter) |
| Resin Being Used: | PP3546G (Exxon Resin) |
| Additives Being used: | NONE |
| Trial Name: | TR2785B |
| LOT: | 0510134 |

| TEST | | Average | Minimum | Maximum | St. Dev. | N |
|---|---|---|---|---|---|---|
| Basis Weight (entire product) | (g/m$^2$) | 146.34 | 120.1 | 173.1 | 12.1 | 48 |
| Basis Weight (fine fiber only) | (g/m$^2$) | 19.3 | 19.3 | 19.3 | 0 | 1 |
| NaCl Resistance | (mmH$_2$O @ 32 LPM) | 3.4 | 2.5 | 4.28 | 0.43 | 48 |
| NaCl Penetration (after IPA/DOP soak) | (% @ 32 LPM) | 40.5 | 38.2 | 48 | 3.23 | 12 |
| NaCl Alpha after IPA/DOP soak | (Unitless) | 11.54544 | | | | |
| Fiber Diameter (fine fiber only) | (Microns) | 1.16 | | | | |

TABLE XXIII

RUN 2

| | |
|---|---|
| Scrim Being blown Onto: | Typar 3121 |
| Layer being collated in: | TR2786A (Coarse fibered meltblown Prefilter) |
| Resin Being Used: | PP3546G (Exxon Resin) |
| Additives Being used: | NONE |
| Trial Name: | TR2785A |
| LOT: | 0510296 |

| TEST | | Average | Minimum | Maximum | St. Dev. | N |
|---|---|---|---|---|---|---|
| Basis Weight (entire product) | (g/m$^2$) | 149.21 | 130.5 | 165.8 | 7.78 | 100 |
| Basis Weight (fine fiber only) | (g/m$^2$) | 19.78 | 17.2 | 22.8 | 1.62 | 11 |
| NaCl Resistance | (mmH$_2$O @ 32 LPM) | 3.43 | 2.7 | 4.26 | 0.32 | 100 |
| NaCl Penetration (after IPA/DOP soak) | (% @ 32 LPM) | 38 | 36.2 | 39.8 | 1.8 | 2 |
| NaCl Alpha after IPA/DOP soak | (Unitless) | 12.251207 | | | | |
| Fiber Diameter (fine fiber only) | (Microns) | 1.23 | | | | |

TABLE XXIV

Coarse Fiber Meltblown Layer Used with Both 80–85% and 90–95% ASHRAE Products

| | | |
|---|---|---|
| Scrim Being blown Onto: | 0.25 oz/sy Polypropylene Spunbond | |
| Layer being collated in: | N/A | |
| Resin Being Used: | PP3546G (Exxon Resin) | 98% of total meltblown |
| Additives Being used: | Lonza Acrawax C | 2% of total meltblown |
| Trial Name: | TR2786A | |
| LOT: | 0510285 | |

| TEST | | Average | Minimum | Maximum | St. Dev. | N |
|---|---|---|---|---|---|---|
| Basis Weight (entire product) | (g/m$^2$) | 88.84 | 74.5 | 109.8 | 7.55 | 150 |
| Basis Weight (fine fiber only) | (g/m$^2$) | N/A | N/A | N/A | N/A | N/A |
| NaCl Resistance | (mmH$_2$O @ 32 LPM) | 0.33 | 0.14 | 0.53 | 0.07 | 150 |
| NaCl Penetration (before IPA/DOP soak) | (% @ 32 LPM) | 53.31 | 44.5 | 66.5 | 4.07 | 150 |
| NaCl Alpha after IPA/DOP soak | (Unitless) | N/A | | | | |
| Fiber Diameter (fine fiber only) | (Microns) | N/A | | | | |

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of forming filter media, such method comprising the steps of:

extruding and melt blowing at least one fine fiber filter layer onto a support layer, wherein the at least one fine fiber filter layer has fibers with a diameter of less than about 1.5 microns and is deposited with a basis weight effective to achieve filtration above 50% and an alpha, as measured in a discharged condition, of at least about eleven.

2. The method of claim 1, wherein the support layer is a spun bond support.

3. The method of claim 1, wherein the at least one melt blown fine fiber layer is deposited on the spun bond support and adhered thereto in a heated state.

4. The method of claim 1, wherein the support layer includes a coarse fiber prefilter.

5. The method of claim 1, wherein the coarse fiber prefilter is mechanically adhered to the at least one fine fiber filter layer.

6. The method of claim 1, wherein the support layer is formed from fibers having a diameter in the range of about 5 microns to 15 microns.

7. The method of claim 1, wherein the at least one fine fiber filter layer has a web basis weight in the range of about 6 $g/m^2$ to 25 $g/m^2$.

8. The method of claim 1, wherein the support layer has a web basis weight in the range of about 34 $g/m^2$ to 55 $g/m^2$.

9. The method of claim 1, further comprising a pre-filter layer mated to the support layer.

10. The method of claim 1, further comprising the step of charging the filter media to form an electret.

11. A method of forming a filter media for use in heating, refrigeration, ventilation, and exhaust duct filtering applications, the method comprising the steps of:

extruding and melt blowing at least one microfiber polymer web onto a support layer to form a mechanically bonded web, the microfiber polymer web being formed of fine fibers having a diameter of less than about 1.5 microns;

wherein the filter media has a base alpha value of at least about 11 throughout the useful life of the filter media, even after decay of any charge that may be present.

12. The method of claim 11, wherein the support layer is a spun bond support.

13. The method of claim 11, wherein the support layer includes a coarse fiber prefilter.

14. The method of claim 11, wherein the support layer is formed from fibers having a diameter in the range of about 5 microns to 15 microns.

15. The method of claim 11, wherein the at least one microfiber polymer web has a web basis weight in the range of about 6 $g/m^2$ to 25 $g/m^2$.

16. The method of claim 11, wherein the support layer has a web basis weight in the range of about 34 $g/m^2$ to 55 $g/m^2$.

17. The method of claim 11, further comprising a pre-filter layer mated to the support layer.

18. The method of claim 11, further comprising the step of charging the filter media to form an electret.

* * * * *

UNITED STATES PATENT AND TRADEMARK OFFICE
CERTIFICATE OF CORRECTION

PATENT NO. : 6,858,057 B2
DATED : February 22, 2005
INVENTOR(S) : David T. Healey It is certified that error appears in the above-identified patent and that said Letters Patent is hereby corrected as shown below:

<u>Title page,</u>
Item [73], Assignee, should be -- Hollingsworth & Vose Company --.

Signed and Sealed this

Twenty-fourth Day of May, 2005

JON W. DUDAS
*Director of the United States Patent and Trademark Office*